US010692657B2

United States Patent
Tsubaki et al.

(10) Patent No.: US 10,692,657 B2
(45) Date of Patent: Jun. 23, 2020

(54) ELECTROLYTIC CAPACITOR AND METHOD FOR MANUFACTURING SAME

(71) Applicant: Panasonic Intellectual Property Management Co., Ltd., Osaka (JP)

(72) Inventors: Yuichiro Tsubaki, Kyoto (JP); Tatsuji Aoyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/952,235

(22) Filed: Apr. 13, 2018

(65) Prior Publication Data

US 2018/0233292 A1    Aug. 16, 2018

Related U.S. Application Data

(63) Continuation of application No. PCT/JP2016/004721, filed on Oct. 27, 2016.

(30) Foreign Application Priority Data

Oct. 30, 2015   (JP) .................................. 2015-213985

(51) Int. Cl.
*H01G 9/035*   (2006.01)
*H01G 9/028*   (2006.01)
(Continued)

(52) U.S. Cl.
CPC .......... *H01G 9/035* (2013.01); *H01G 9/0036* (2013.01); *H01G 9/025* (2013.01); *H01G 9/028* (2013.01);
(Continued)

(58) Field of Classification Search
CPC .......... H01G 9/151; H01G 9/145; H01G 9/15; H01G 9/035; H01G 9/028; H01G 9/0036; H01G 9/025

See application file for complete search history.

(56) References Cited

U.S. PATENT DOCUMENTS

2009/0109602 A1    4/2009 Kakuma et al.
2009/0147443 A1    6/2009 Honda et al.
(Continued)

FOREIGN PATENT DOCUMENTS

CN           101512693 A      8/2009
JP           06029157 A   *  2/1994
(Continued)

OTHER PUBLICATIONS

International Search Report of PCT application No. PCT/JP2016/004721 dated Jan. 17, 2017.
(Continued)

*Primary Examiner* — Eric W Thomas
(74) *Attorney, Agent, or Firm* — McDermott Will and Emery LLP

(57) ABSTRACT

An electrolytic capacitor includes a capacitor element, a solid electrolyte layer, and an electrolyte solution. The capacitor element includes an anode body on a surface of which a dielectric layer is formed. The solid electrolyte layer is provided on the dielectric layer and includes a conductive polymer and a polymer dopant. The electrolyte solution is impregnated into the capacitor element and contains a polyhydric alcohol and a borate ester.

8 Claims, 1 Drawing Sheet

(51) Int. Cl.
*H01G 9/025*  (2006.01)
*H01G 9/00*   (2006.01)
H01G 9/04    (2006.01)
H01G 9/07    (2006.01)
H01G 9/15    (2006.01)

(52) U.S. Cl.
CPC ................. *H01G 9/04* (2013.01); *H01G 9/07* (2013.01); *H01G 9/15* (2013.01)

(56) References Cited

U.S. PATENT DOCUMENTS

2015/0213962 A1   7/2015   Koseki et al.
2016/0355636 A1   12/2016  Sugihara et al.

FOREIGN PATENT DOCUMENTS

| JP | 2009-111174 | 5/2009 |
| WO | 2008/029821 | 3/2008 |
| WO | 2014/021333 | 2/2014 |
| WO | 2015/129515 | 9/2015 |

OTHER PUBLICATIONS

English Translation of Chinese Search Report dated Jul. 2, 2019 for the related Chinese Patent Application No. 201680062213.4.

* cited by examiner

ELECTROLYTIC CAPACITOR AND METHOD FOR MANUFACTURING SAME

RELATED APPLICATIONS

This application is a continuation of the PCT International Application No. PCT/JP2016/004721 filed on Oct. 27, 2016, which claims the benefit of foreign priority of Japanese patent application No. 2015-213985 filed on Oct. 30, 2015, the contents all of which are incorporated herein by reference.

BACKGROUND

1. Technical Field

The present disclosure relates to an electrolytic capacitor including a solid electrolyte layer and an electrolyte solution, and a method for manufacturing the electrolytic capacitor.

2. Description of the Related Art

As capacitors having a small size, a large capacitance, and low ESR (Equivalent Series Resistance), promising candidates are electrolytic capacitors including an anode body on which a dielectric layer is formed, a solid electrolyte layer formed so as to cover at least a part of the dielectric layer, and an electrolyte solution. For example, Unexamined Japanese Patent Publication No. 2009-111174 discloses an electrolytic capacitor obtained by impregnating a solid electrolyte layer with a solvent containing, for example, γ-butyrolactone or sulfolane.

SUMMARY

An electrolytic capacitor according to the present disclosure includes a capacitor element, a solid electrolyte layer, and an electrolyte solution. The capacitor element includes an anode body on a surface of which a dielectric layer is formed. The solid electrolyte layer is provided on the dielectric layer and includes a conductive polymer and a polymer dopant. The electrolyte solution is impregnated into the capacitor element and contains a polyhydric alcohol and a borate ester.

A method for manufacturing an electrolytic capacitor according to the present disclosure includes following first to third steps. The first step includes preparing a capacitor element having an anode body on a surface of which a dielectric layer is formed. The second step includes forming a solid electrolyte layer on the dielectric layer with use of a dispersion containing a conductive polymer, a polymer dopant, and a solvent. The third step includes impregnating the capacitor element having the solid electrolyte layer with an electrolyte solution containing a polyhydric alcohol and a borate ester.

According to the present disclosure, there can be provided an electrolytic capacitor that can maintain low ESR for a long time and is high in reliability.

DETAILED DESCRIPTION OF EMBODIMENT

Figure 1:
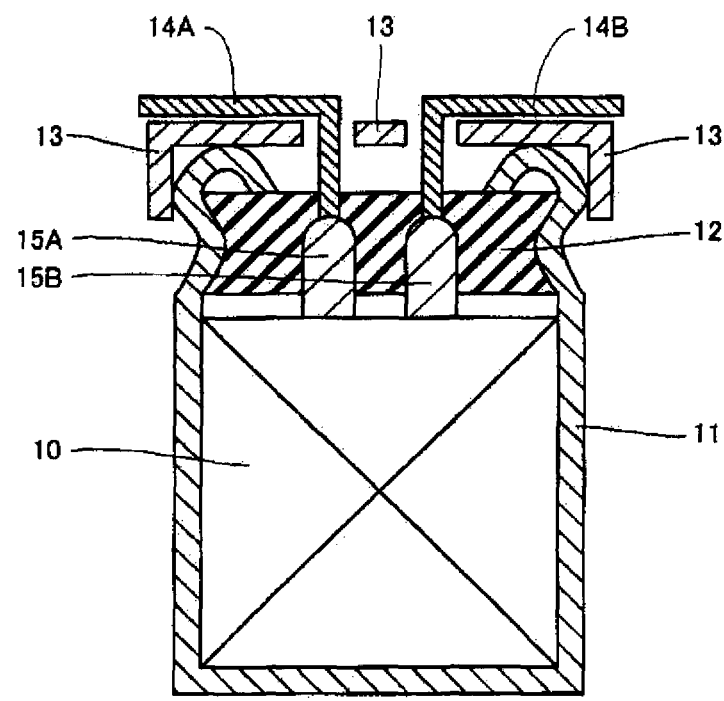
FIG. 1 is a schematic sectional view illustrating an electrolytic capacitor according to an exemplary embodiment of the present disclosure.

In a conventional electrolytic capacitor including a solid electrolyte layer and an electrolyte solution, when a long-term load test is conducted at 100° C. or higher, ESR tends to sharply increase after an elapse of a certain time although low ESR is exhibited in an initial stage.

In view of the foregoing, the present disclosure provides an electrolytic capacitor that can maintain low ESR.

An electrolytic capacitor according to the present disclosure includes an anode body having a dielectric layer; a solid electrolyte layer in contact with the dielectric layer; and an electrolyte solution. The solid electrolyte layer includes a conductive polymer and a polymer dopant. The electrolyte solution contains a polyhydric alcohol and a borate ester.

The electrolyte solution containing the borate ester allows the borate ester to absorb moisture in the electrolyte solution. In the absorption, the borate ester is hydrolyzed. The absorption of moisture in the electrolyte solution by the borate ester suppresses dedoping of the polymer dopant, which is caused by moisture in the electrolyte solution. This can suppress a decrease in electric conductivity of the solid electrolyte layer, which is caused by the dedoping, so that deterioration of ESR of the electrolytic capacitor can be suppressed. In addition, since moisture in the electrolyte solution can be reduced, it is possible to prevent an increase in internal pressure of the electrolytic capacitor in a solder reflow process of the electrolytic capacitor.

As the borate ester, a polycondensate of boric acid and an alcohol, or a polycondensate of boric acid and an ether alcohol can be used. The alcohol is preferably a polyhydric alcohol. And a polyalkylene glycol is particularly preferable for the alcohol. The ether alcohol is preferably a polyalkylene glycol monoalkyl ether. The borate ester can swell the conductive polymer by a polyhydric alcohol generated by hydrolysis, so that ESR of the electrolytic capacitor can be reduced.

As the borate ester, there can be used borate esters represented by following formulae (1) to (3).

Formula (1)

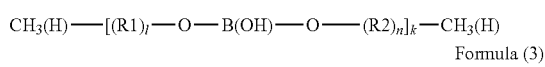
Formula (2)

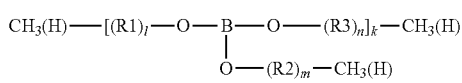
Formula (3)

A terminal end may be $CH_3$ or H. R1, R2, and R3 are any one of $-CH_2O-$, $-C_2H_4O-$, $-C_3H_6O-$, and $-C_4H_8O-$. k, l, m, and n are any natural number.

In the borate esters represented by the formulae (1) to (3), a value of each of l, m, and n is more preferably ranges from 2 to 5, inclusive. When each of l, m, and n has a value of 2 or more, a hydrolysis product of the borate ester is less likely to evaporate from the electrolyte solution, so that it is possible to suppress an increase in internal pressure of the electrolytic capacitor. When each of l, m, and n has a value of 5 or less, a proportion of boric acid in the borate ester increases, so that an effect of absorbing moisture in the electrolyte solution can be improved.

As a conventional electrolytic capacitor, there is exemplified an electrolyte capacitor including an electrolyte solution to which boric acid and saccharide such as mannitol are directly added. This case, however, is not preferable because moisture generated by esterification of boric acid and saccharide accelerates dedoping of the polymer dopant.

A content proportion of the borate ester ranges desirably from 2% by mass to 60% by mass, inclusive, particularly desirably from 5% by mass to 40% by mass, inclusive, relative to 100% by mass of the electrolyte solution. When a proportion of the borate ester is 2% by mass or more, the effect of absorbing moisture in the electrolyte solution by the borate ester increases. When a proportion of the borate ester is 60% by mass or less, it is possible to maintain a certain amount of moisture in the electrolyte solution, so that the electrolyte solution can maintain an effect of repairing the dielectric layer.

When the electrolyte solution contains the polyhydric alcohol, it is likely to cause dedoping of the polymer dopant, which is attributed to moisture in the electrolyte solution. The electrolyte solution containing the borate ester, however, significantly suppresses dedoping of the polymer dopant. This can significantly suppress deterioration of ESR for the electrolytic capacitor.

The polyhydric alcohol desirably includes at least one of ethylene glycol, diethylene glycol, triethylene glycol, propylene glycol, butane diol, a polyalkylene glycol, and glycerol, for example. Particularly, ethylene glycol or a polyalkylene glycol is preferable because ethylene glycol or a polyalkylene glycol increases an effect of suppressing dedoping of the polymer dopant by the borate ester. As the polyalkylene glycol, it is preferable to use polyethylene glycol having an average molecular weight ranging from 200 to 1000, inclusive, or polypropylene glycol having an average molecular weight ranging from 200 to 5000, inclusive.

A proportion of the polyhydric alcohol contained in the electrolyte solution is desirably 15% by mass or more, more desirably 30% by mass or more. The electrolyte solution containing the polyhydric alcohol increases the effect of suppressing dedoping of the polymer dopant by the borate ester.

The electrolyte solution can contain, for example, a sulfone compound, a lactone compound, a carbonate compound, and a monohydric alcohol, in addition to the polyhydric alcohol. As the sulfone compound, there can be used, for example, sulfolane, dimethyl sulfoxide, and diethyl sulfoxide. As the lactone compound, there can be used, for example, γ-butyrolactone and γ-valerolactone. As to the carbonate compound, the electrolyte solution can contain, as a solvent, dimethyl carbonate, diethyl carbonate, ethyl methyl carbonate, ethylene carbonate, propylene carbonate, and fluoroethylene carbonate, for example. These compounds may be used alone or in combination of a plurality of compounds.

A proportion of the solvent in the electrolyte solution desirably ranges from 2% by mass to 70% by mass, inclusive. When the solvent is used, γ-butyrolactone and sulfolane are desirably used.

A proportion of moisture contained in the electrolyte solution ranges desirably from 0.1% by mass to 3.0% by mass, inclusive, particularly desirably from 0.3% by mass to 1.0% by mass, inclusive. The electrolyte solution containing 0.1% by mass or more of moisture can maintain the effect of repairing the dielectric layer by the electrolyte solution. The electrolyte solution containing 3.0% by mass or less of moisture can suppress dedoping of the polymer dopant in the solid electrolyte layer.

The electrolyte solution may also contain a solute. As the solute, there can be used, for example, an acid component, a basic component, a salt of an acid component and a basic component, a nitro compound, and a phenol compound.

As the acid compound, there can be used an organic acid, an inorganic acid, and a composite compound of an organic acid and an inorganic acid. As the organic acid, there can be used, for example, phthalic acid, isophthalic acid, terephthalic acid, maleic acid, adipic acid, benzoic acid, and carboxylic acids such as 1,6-decanedicarboxylic acid, 1,7-octanedicarboxylic acid, and azelaic acid. As the inorganic acid, there can be used, for example, boric acid, phosphoric acid, phosphorous acid, hypophosphorous acid, and a phosphate ester. Particularly, the electrolyte solution containing the carboxylic acid has a particularly high effect of suppressing dedoping of the polymer dopant by the borate ester.

As the composite compound of an organic acid and an inorganic acid, there can be used, for example, borodisalicylic acid, borodioxalic acid, and borodiglycolic acid. The electrolyte solution containing the composite compound of an organic acid and an inorganic acid has a particularly high effect of suppressing dedoping of the polymer dopant by the borate ester. The composite compound of an organic acid and an inorganic acid is likely to be hydrolyzed by moisture in the electrolyte solution. The hydrolysis of the composite compound increases pH of the electrolyte solution to allow dedoping of the polymer dopant in the solid electrolyte layer. The electrolyte solution containing the borate ester allows the borate ester to absorb moisture in the electrolyte solution, so that the composite compound is less likely to be hydrolyzed and thus an increase in pH of the electrolyte solution is suppressed. This suppresses dedoping of the polymer dopant in the solid electrolyte layer to suppress deterioration of ESR.

As the basic component, there can be used, for example, a primary amine, a secondary amine, a tertiary amine, a quaternary ammonium, and a quaternized amidinium. As the primary to tertiary amines, there can be used, for example, methylamine, dimethylamine, trimethylamine, ethylamine, diethylamine, triethylamine, ethylenediamine, N,N-diisopropylethylamine, tetramethylethylenediamine, and hexamethylenediamine. As the quaternary ammonium, there can be used, for example, tetramethylammonium, triethylmethylammonium, and tetraethylammonium. As the quaternized amidinium, there can be used, for example, ethyldimethylimidazolinium and tetramethylimidazolinium.

A proportion of the solute contained in the electrolyte solution desirably ranges from 1% by mass to 30% by mass, inclusive. When the proportion of the solute is in this range, an increase in viscosity of the electrolyte solution is small, and a voltage is less likely to decrease.

The conductive polymer included in the solid electrolyte layer is preferably, for example, polypyrrole, polythiophene, and polyaniline. These conductive polymers may be used alone, or two or more of the conductive polymers may be used in combination, or a copolymer of two or more monomers may be used. The solid electrolyte layer including such a conductive polymer can be expected to further improve withstand voltage characteristics.

In the present specification, polypyrrole, polythiophene, polyaniline, and the like mean polymers having, as a basic skeleton, polypyrrole, polythiophene, polyaniline, and the like, respectively. Therefore, polypyrrole, polythiophene, polyaniline, and the like can also include derivatives of polypyrrole, polythiophene, polyaniline, and the like, respectively. For example, polythiophene includes poly(3,4-ethylenedioxythiophene) (PEDOT) and the like.

The solid electrolyte layer includes the polymer dopant as a dopant for the conductive polymer. Examples of the polymer dopant include polyanions of polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These polymer dopants may be used alone, or two or more of the dopants may be used in combination. These polymer dopants may be a homopolymer or a copolymer of two or more monomers. Especially, polystyrenesulfonic acid (PSS) is preferable.

A weight average molecular weight of the polymer dopant is not particularly limited but preferably ranges, for example, from 1000 to 100000, inclusive, in terms of facilitating formation of a homogeneous solid electrolyte layer.

Hereinafter, the present disclosure is more specifically described with reference to an exemplary embodiment. The exemplary embodiment described below, however, is not for limiting the present disclosure.

Figure 2:
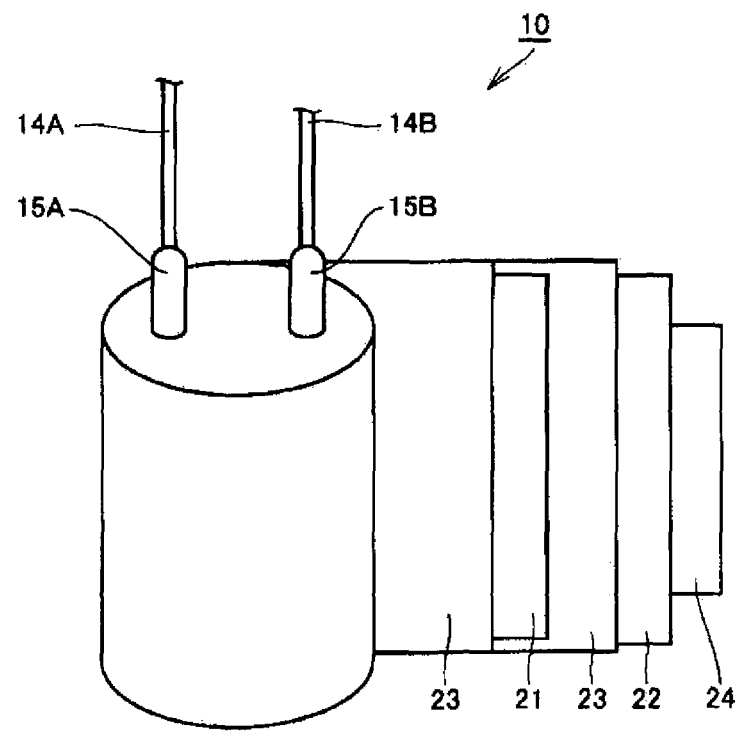
FIG. 2 is a schematic view for illustrating a configuration of a capacitor element according to the exemplary embodiment.

FIG. 1 is a schematic sectional view illustrating an electrolytic capacitor according to the present exemplary embodiment, and FIG. 2 is a schematic view obtained by developing a part of a capacitor element of the electrolytic capacitor.

The electrolytic capacitor includes, for example, capacitor element 10, bottomed case 11 that houses capacitor element 10, sealing member 12 that seals an opening of bottomed case 11, base plate 13 that covers sealing member 12, lead wires 14A, 14B that are lead out from sealing member 12 and penetrate base plate 13, lead tabs 15A, 15B that connect the lead wires to electrodes of capacitor element 10, respectively, and an electrolyte solution (not shown). Bottomed case 11 is, at a part near an opening end, processed inward by drawing, and is, at the opening end, curled to swage sealing member 12.

Sealing member 12 is formed of an elastic material containing a rubber component. As the rubber component, there can be used, for example, a butyl rubber (IIR), a nitrile rubber (NBR), an ethylene propylene rubber, an ethylene propylene diene rubber (EPDM), a chloroprene rubber (CR), an isoprene rubber (IR), a Hypalon (registered trademark) rubber, a silicone rubber, and a fluorine-containing rubber. Sealing member 12 may contain fillers such as carbon black and silica.

Capacitor element 10 includes anode body 21 connected to lead tab 15A, cathode body 22 connected to lead tab 15B, and separator 23.

Anode body 21 and cathode body 22 are wound with separator 23 interposed between the anode body and the cathode body. An outermost periphery of capacitor element 10 is fixed with fastening tape 24. FIG. 2 shows partially developed capacitor element 10 before an outermost periphery of the capacitor element is fixed.

Anode body 21 includes a metal foil whose surface is roughened so as to have projections and recesses, and a dielectric layer is formed on the metal foil having the projections and recesses. A conductive polymer is attached to at least a part of a surface of the dielectric layer to form a solid electrolyte layer. The solid electrolyte layer may cover at least a part of a surface of cathode body 22 and/or at least a part of a surface of separator 23. Capacitor element 10 in which the solid electrolyte layer has been formed is housed in an outer case together with the electrolyte solution.

<<Method for Manufacturing Electrolytic Capacitor>>

Hereinafter, steps of one exemplary method for manufacturing the electrolytic capacitor according to the present exemplary embodiment are described.

(i) Step of Preparing Anode Body 21 Having Dielectric Layer

First, a metal foil as a raw material for anode body 21 is prepared. A type of the metal is not particularly limited, but it is preferred to use a valve metal such as aluminum, tantalum, or niobium, or an alloy including a valve metal, from the viewpoint of facilitating formation of a dielectric layer.

Next, a surface of the metal foil is roughened. By the roughening, a plurality of projections and recesses are formed on the surface of the metal foil. The roughening is preferably performed by etching the metal foil. The etching may be performed by, for example, a direct-current electrolytic method or an alternating-current electrolytic method.

Next, a dielectric layer is formed on the roughened surface of the metal foil. A method for forming the dielectric layer is not particularly limited, and the dielectric layer can be formed by subjecting the metal foil to an anodizing treatment. The anodizing treatment is performed by, for example, immersing the metal foil in an anodizing solution such as an ammonium adipate solution, followed by a heat treatment. The anodizing treatment may also be performed by applying a voltage to the metal foil that has been immersed in the anodizing solution.

Normally, a large foil of, for example, a valve metal (metal foil) is subjected to the roughening treatment and the anodizing treatment from the viewpoint of mass productivity. In this case, the treated foil is cut into a desired size to prepare anode body 21.

(ii) Step of Preparing Cathode Body 22

A metal foil can be used for cathode body 22 as with the anode body. A type of the metal is not particularly limited, but it is preferred to use a valve metal such as aluminum, tantalum, or niobium, or an alloy including a valve metal. A surface of cathode body 22 may be roughened as necessary. Further, an anodizing coating film, a coating film of titanium or a titanium compound, or a carbon layer may be formed on the surface of cathode body 22 as necessary.

(iii) Production of Capacitor Element 10

Next, capacitor element 10 is produced with use of anode body 21 and cathode body 22. First, anode body 21 and cathode body 22 are wound with separator 23 interposed between the anode body and the cathode body. At this time, the winding can be conducted while lead tabs 15A, 15B are rolled in the anode body, the cathode body, and the separator, to cause lead tabs 15A, 15B to stand up from capacitor element 10 as illustrated in FIG. 2.

As a material for separator 23, a nonwoven fabric can be used that includes, as a main component, for example, cellulose, polyethylene terephthalate, polyacrylonitrile, vinylon, or an aramid fiber.

A material for lead tabs 15A, 15B is not particularly limited as long as the material is a conductive material. A material for lead wires 14A, 14B connected to lead tabs 15A, 15B, respectively, is not also particularly limited as long as the material is a conductive material.

Next, fastening tape 24 is disposed on an outer surface of cathode body 22 positioned at an outermost layer of wound anode body 21, cathode body 22, and separator 23, to fix an end of cathode body 22 with fastening tape 24. When anode body 21 is prepared by cutting a large metal foil, the wound body may further be subjected to an anodizing treatment in order to provide a dielectric layer on a cutting surface of anode body 21.

(iv) Step of Forming Solid Electrolyte Layer

Next, the dielectric layer is impregnated with a polymer dispersion to form a film covering at least a part of the dielectric layer. The polymer dispersion contains a liquid component and a conductive polymer dispersed in the liquid component. The polymer dispersion may be a solution obtained by dissolving the conductive polymer in the liquid component, or a dispersion liquid obtained by dispersing particles of the conductive polymer in the liquid component. Next, the formed film is dried to volatilize the liquid component from the film, forming a dense solid electrolyte layer covering at least a part of the dielectric layer. In the polymer dispersion, the conductive polymer is uniformly distributed in the liquid component to easily form a uniform solid electrolyte layer. Thus, capacitor element 10 can be obtained.

The polymer dispersion can be obtained by, for example, a method for dispersing the conductive polymer in the liquid component or a method for polymerizing a precursor monomer in the liquid component and generating particles of the conductive polymer.

The liquid component may be water, a mixture of water and a nonaqueous solvent, or a nonaqueous solvent. The nonaqueous solvent is not particularly limited, and a protic solvent and an aprotic solvent can be used, for example. Examples of the protic solvent include alcohols such as methanol, ethanol, propanol, butanol, ethylene glycol, propylene glycol, and a polyalkylene glycol, formaldehyde, and ethers such as 1,4-dioxane. Examples of the aprotic solvent include amides such as N-methylacetamide, N,N-dimethylformamide, and N-methyl-2-pyrrolidone, esters such as methyl acetate, and ketones such as methyl ethyl ketone.

A concentration of the conductive polymer contained in the polymer dispersion preferably ranges from 0.5% by mass to 10% by mass, inclusive. An average particle diameter D50 of the conductive polymer preferably ranges, for example, from 0.01 μm to 0.5 μm, inclusive. Here, the average particle diameter D50 is a median diameter in a volume particle size distribution obtained by a particle size distribution measuring apparatus according to dynamic light scattering. The polymer dispersion having such a concentration is suitable for forming a solid electrolyte layer having an appropriate thickness and is easily impregnated into the dielectric layer.

As a method for applying the polymer dispersion to a surface of the dielectric layer, for example, a method for immersing the wound body in the polymer dispersion housed in a container is simple and preferred. An immersion time depends on a size of the wound body, but ranges, for example, from 1 second to 5 hours, inclusive, preferably from 1 minute to 30 minutes, inclusive. In addition, impregnation is preferably performed under a reduced pressure, in an atmosphere ranging, for example, from 10 kPa to 100 kPa, inclusive, preferably from 40 kPa to 100 kPa, inclusive. Further, ultrasonic vibration may be applied to the wound body or the polymer dispersion while the wound body is immersed in the polymer dispersion. The drying after picking the wound body up from the polymer dispersion is performed at a temperature ranging preferably from 50° C. to 300° C., inclusive, more preferably from 100° C. to 200° C., inclusive, for example.

The step of applying the polymer dispersion to the surface of the dielectric layer and the step of drying capacitor element 10 may be repeated two or more times. These steps can be performed a plurality of times to increase coverage of the solid electrolyte layer on the dielectric layer. In the formation, the solid electrolyte layer may be formed on not only the surface of the dielectric layer but also surfaces of cathode body 22 and separator 23.

As described above, the solid electrolyte layer is formed between anode body 21 and cathode body 22. The solid electrolyte layer formed on the surface of the dielectric layer virtually functions as a cathode material.

(v) Step of Impregnating Capacitor Element 10 with Electrolyte Solution

Next, capacitor element 10 is impregnated with an electrolyte solution. A method for impregnating capacitor element 10 with the electrolyte solution is not particularly limited. For example, a method for immersing capacitor element 10 in the electrolyte solution housed in a container is simple and preferred. An immersion time depends on a size of capacitor element 10, and ranges, for example, from 1 second to 5 minutes, inclusive. Impregnation is preferably performed under a reduced pressure, in an atmosphere ranging, for example, from 10 kPa to 100 kPa, inclusive, preferably from 40 kPa to 100 kPa, inclusive.

(vi) Step of Encapsulating Capacitor Element

Next, capacitor element 10 is encapsulated. Specifically, first, capacitor element 10 is housed in bottomed case 11 so that lead wires 14A, 14B are positioned on an open upper surface of bottomed case 11. As a material for bottomed case 11, there can be used metals such as aluminum, stainless steel, copper, iron and brass, or alloys of these metals.

Next, sealing member 12 formed so as to allow lead wires 14A, 14B to penetrate the sealing member is disposed above capacitor element 10 so as to encapsulate capacitor element 10 in bottomed case 11. Next, bottomed case 11 is, at a part near an opening end, processed by transverse drawing, and is, at the opening end, curled to swage sealing member 12. Then, base plate 13 is disposed on a curled part of the bottomed case to complete the electrolytic capacitor as illustrated in FIG. 1. Then, an aging treatment may be performed while a voltage is applied.

In the exemplary embodiment described above, a wound electrolytic capacitor has been described. The application range of the present disclosure, however, is not limited to the wound electrolytic capacitor and can also be applied to other electrolytic capacitors such as an electrolytic capacitor including a metal sintered body as an anode body, and a laminated electrolytic capacitor including a metal foil as an anode body.

EXAMPLES

Hereinafter, the present disclosure is described in more detail with reference to examples. The present disclosure, however, is not to be considered to be limited to the examples.

Example 1

In the present example, a wound electrolytic capacitor having a rated voltage of 80 V and a rated electrostatic capacity of 38 μF was produced. Hereinafter, a specific method for manufacturing the electrolytic capacitor is described.

(Preparation of Anode Body)

A 100-μm-thick aluminum foil was subjected to etching to roughen a surface of the aluminum foil. Then, a dielectric layer was formed on the surface of the aluminum foil by an anodizing treatment. The anodizing treatment was performed by immersing the aluminum foil in an ammonium adipate solution and applying a voltage of 150 V to the aluminum foil. Then, the aluminum foil was cut into a size of 6 mm (length)×120 mm (width) to prepare an anode body.

(Preparation of Cathode Body)

A 50-μm-thick aluminum foil was subjected to etching to roughen a surface of the aluminum foil. Then, the aluminum foil was cut into a size of 6 mm (length)×120 mm (width) to prepare a cathode body.

(Production of Capacitor Element)

An anode lead tab and a cathode lead tab were connected to the anode body and the cathode body, respectively. And then the anode body and the cathode body were wound with a separator interposed between the anode body and the cathode body while the lead tabs were rolled in the anode body, the cathode body, and the separator. Ends of the lead tabs protruding from a wound body were connected to an anode lead wire and a cathode lead wire, respectively. Then, the produced wound body was subjected to an anodizing treatment again to form a dielectric layer at a cutting end of the anode body. Next, an end of an outer surface of the wound body was fixed with a fastening tape to produce a capacitor element.

(Preparation of Polymer Dispersion)

A mixed solution was prepared by dissolving 3,4-ethylenedioxythiophene and polystyrenesulfonic acid (PSS, weight average molecular weight 100000) in ion-exchanged water (liquid component). While the mixed solution was stirred, iron (III) sulfate (oxidant) that had been dissolved in ion-exchanged water was added to the mixed solution to cause a polymerization reaction. After the polymerization reaction, a resultant reaction solution was dialyzed to remove unreacted monomers and an excessive oxidant, so that a polymer dispersion was obtained that contained about 5% by mass of polyethylene dioxythiophene doped with PSS (PEDOT/PSS).

(Formation of Solid Electrolyte Layer)

The capacitor element was immersed in the polymer dispersion housed in a predetermined container in a reduced-pressure atmosphere (40 kPa) for 5 minutes, and then the capacitor element was picked up from the polymer dispersion. Next, the capacitor element that had been impregnated with the polymer dispersion was dried in a drying furnace at 150° C. for 20 minutes to form a solid electrolyte layer covering at least a part of the dielectric layer.

(Impregnation with Electrolyte Solution)

An electrolyte solution was prepared, the electrolyte solution containing 22.5% by mass of γ-butyrolactone, 22.5% by mass of sulfolane, 20% by mass of polyethylene glycol having an average molecular weight of about 300, 15% by mass of ethyldimethylamine phthalate, and 20% by mass of a borate ester, i.e., a polycondensate of triethylene glycol monomethyl ether, diethylene glycol, and boric acid. And the capacitor element was immersed in the electrolyte solution in a reduced-pressure atmosphere (40 kPa) for 5 minutes.

(Encapsulation of Capacitor Element)

The capacitor element that had been impregnated with the electrolyte solution was encapsulated to complete an electrolytic capacitor. Specifically, the capacitor element was housed in a bottomed case so that lead wires were positioned on an opening side of the bottomed case. And a sealing member (an elastic material including a butyl rubber as a rubber component) that was formed so as to allow the lead wires to penetrate the sealing member was disposed above the capacitor element, so that the capacitor element was encapsulated in the bottomed case. The bottomed case was, at a part near an opening end, processed by drawing and was further curled at the opening end, and a base plate was disposed on a curled part to complete the electrolytic capacitor as illustrated in FIG. 1. Thereafter, an aging treatment was performed at 130° C. for 2 hours while a rated voltage was applied.

Example 2

An electrolytic capacitor was produced in the same manner as in Example 1 except for using, as the borate ester, a polycondensate of triethylene glycol monomethyl ether, diethylene glycol monomethyl ether, and boric acid. And the electrolytic capacitor was evaluated in the same manner.

Example 3

An electrolytic capacitor was produced in the same manner as in Example 1 except for using, as the borate ester, a polycondensate of triethylene glycol monomethyl ether, triethylene glycol, and boric acid. And the electrolytic capacitor was evaluated in the same manner.

Example 4

An electrolytic capacitor was produced in the same manner as in Example 1 except for changing the proportion of γ-butyrolactone to 31.5% by mass, the proportion of sulfolane to 31.5% by mass, and the proportion of the borate ester to 2% by mass. And the electrolytic capacitor was evaluated in the same manner.

Example 5

An electrolytic capacitor was produced in the same manner as in Example 1 except for changing the proportion of γ-butyrolactone to 30% by mass, the proportion of sulfolane to 30% by mass, and the proportion of the borate ester to 5% by mass. And the electrolytic capacitor was evaluated in the same manner.

Example 6

An electrolytic capacitor was produced in the same manner as in Example 1 except for changing the proportion of γ-butyrolactone to 12.5% by mass, the proportion of sulfolane to 12.5% by mass, and the proportion of the borate ester to 40% by mass. And the electrolytic capacitor was evaluated in the same manner.

Example 7

An electrolytic capacitor was produced in the same manner as in Example 1 except for changing the proportion of γ-butyrolactone to 2.5% by mass, the proportion of sulfolane to 2.5% by mass, and the proportion of the borate ester to 60% by mass. And the electrolytic capacitor was evaluated in the same manner.

Example 8

An electrolytic capacitor was produced in the same manner as in Example 1 except for using 65% by mass of ethylene glycol in place of γ-butyrolactone, sulfolane, and polyethylene glycol. And the electrolytic capacitor was evaluated in the same manner.

Example 9

An electrolytic capacitor was produced in the same manner as in Example 1 except for using 45% by mass of ethylene glycol in place of γ-butyrolactone and sulfolane. And the electrolytic capacitor was evaluated in the same manner.

Example 10

An electrolytic capacitor was produced in the same manner as in Example 1 except for using triethylamine borodisalicylate in place of ethyldimethylamine phthalate. And the electrolytic capacitor was evaluated in the same manner.

Comparative Example 1

An electrolytic capacitor was produced in the same manner as in Example 1 except for using no borate ester. And the electrolytic capacitor was evaluated in the same manner.

Comparative Example 2

An electrolytic capacitor was produced in the same manner as in Comparative Example 1 except for using triethylamine borodisalicylate in place of ethyldimethylamine phthalate. And the electrolytic capacitor was evaluated in the same manner.

Comparative Example 3

An electrolytic capacitor was produced in the same manner as in Example 1 except for using 3% by mass of boric acid and 5% by mass of mannitol in place of the borate ester. And the electrolytic capacitor was evaluated in the same manner.

[Evaluation]

The electrolytic capacitor was retained at 125° C. for 5000 hours while a rated voltage was applied, to evaluate an increase rate in ESR (ΔESR) and an increase rate in leakage current (ΔLC). The ΔESR and the ΔLC were represented by a ratio ($X/X_0$) of a value (X) after retention for 5000 hours to an initial value ($X_0$). Table 1 shows evaluation results.

TABLE 1

| | Proportion of moisture (% by mass) | ΔESR | ΔLC |
|---|---|---|---|
| Example 1 | 0.68 | 1.56 | 1.58 |
| Example 2 | 0.71 | 1.69 | 1.68 |
| Example 3 | 0.74 | 1.62 | 1.52 |
| Example 4 | 1.53 | 2.98 | 2.89 |
| Example 5 | 0.98 | 2.32 | 1.89 |
| Example 6 | 0.42 | 2.16 | 1.87 |
| Example 7 | 0.26 | 3.08 | 2.76 |
| Example 8 | 0.59 | 1.62 | 1.58 |
| Example 9 | 0.63 | 1.49 | 1.46 |
| Example 10 | 0.57 | 2.75 | 2.33 |
| Example 11 | 0.61 | 1.33 | 1.52 |
| Comparative Example 1 | 0.59 | 3.86 | 5.69 |
| Comparative Example 2 | 0.46 | 3.54 | 7.99 |
| Comparative Example 3 | 1.86 | 3.76 | 4.88 |

As shown in Table 1, Examples 1 to 11 have lower values for the ΔESR and ΔLC than values for the ΔESR and ΔLC of Comparative Examples 1 to 3.

The present disclosure can be utilized for an electrolytic capacitor that includes a solid electrolyte layer covering at least a part of a dielectric layer, and an electrolyte solution.

What is claimed is:

1. An electrolytic capacitor comprising:
   a capacitor element including an anode body on a surface of which a dielectric layer is formed;
   a solid electrolyte layer provided on the dielectric layer, the solid electrolyte layer including a conductive polymer and a polymer dopant; and
   an electrolyte solution with which the capacitor element is impregnated, the electrolyte solution containing a polyhydric alcohol and a borate ester,
   wherein a content proportion of the polyhydric alcohol in the electrolyte solution is 15% by mass or more.

2. The electrolytic capacitor according to claim 1, wherein a content proportion of moisture in the electrolyte solution ranges from 0.1% by mass to 3% by mass, inclusive.

3. The electrolytic capacitor according to claim 1, wherein a content proportion of the borate ester in the electrolyte solution ranges from 2% by mass to 60% by mass, inclusive.

4. The electrolytic capacitor according to claim 2, wherein a content proportion of the borate ester in the electrolyte solution ranges from 2% by mass to 60% by mass, inclusive.

5. The electrolytic capacitor according to claim 1, wherein a content proportion of the polyhydric alcohol in the electrolyte solution is 30% by mass or more.

6. The electrolytic capacitor according to claim 1, wherein the polyhydric alcohol includes ethylene glycol or a polyalkylene glycol.

7. The electrolytic capacitor according to claim 1, wherein the electrolyte solution further contains a carboxylic acid or a salt of the carboxylic acid.

8. The electrolytic capacitor according to claim 1, wherein the electrolyte solution further contains a composite compound of an organic acid and an inorganic acid, or a salt of the composite compound.

* * * * *